United States Patent [19]

Sasaki et al.

[11] Patent Number: 4,816,928
[45] Date of Patent: Mar. 28, 1989

[54] APPARATUS FOR RECORDING REPRODUCING A STILL IMAGE AND CORRESPONDING AUDIO INFORMATION IN RESPECTIVE TRACKS ON A DISK WITH THE AUDIO COMPRESSED ON SEGMENTS OF A TRACK

[75] Inventors: Takayuki Sasaki; Katsuhiko Ueno, both of Kanagawa; Eiichi Ichimura, Saitama; Yasumasa Kodama, Kanagawa, all of Japan

[73] Assignee: Sony Corporation, Tokyo, Japan

[21] Appl. No.: 791,152

[22] Filed: Oct. 24, 1985

[30] Foreign Application Priority Data

Nov. 1, 1984 [JP] Japan .................................. 59-230964
Jan. 19, 1985 [JP] Japan ..................................... 60-8065

[51] Int. Cl.$^4$ ............................................. H04N 5/78
[52] U.S. Cl. .................................... 360/35.1; 360/9.1; 360/19.1; 358/342; 358/343; 369/111
[58] Field of Search .................. 360/8, 9.1, 19.1, 35.1; 358/335, 341–343; 369/111

[56] References Cited

U.S. PATENT DOCUMENTS

| | | | |
|---|---|---|---|
| 3,789,137 | 6/1974 | Newell | 360/8 X |
| 3,829,610 | 8/1974 | Meeussen et al. | 369/111 X |
| 4,065,794 | 12/1977 | Shutterly | 360/8 X |
| 4,141,039 | 2/1979 | Yamamoto | 360/8 X |
| 4,142,209 | 2/1979 | Hedlund et al. | 360/77 X |
| 4,321,635 | 3/1982 | Tsuyuguchi | 369/28 X |
| 4,347,527 | 8/1982 | Lairez | 360/191 X |
| 4,348,699 | 9/1982 | Tsuchoya et al. | 360/51 X |
| 4,531,161 | 7/1985 | Murakoshi | 358/341 X |
| 4,534,031 | 8/1985 | Jewer | 369/93 X |
| 4,563,709 | 6/1986 | Hirata | 368/341 X |
| 4,602,295 | 7/1986 | Moriyama et al. | 38/341 X |
| 4,672,471 | 6/1987 | Gouda | 358/341 |
| 4,672,473 | 6/1987 | Sugiyama | 358/341 |
| 4,725,897 | 2/1988 | Konishi | 358/341 X |

FOREIGN PATENT DOCUMENTS 52-36909 3/1977 Japan ..................................... 358/143

OTHER PUBLICATIONS

Copy of INPADDC Search for JP 230964/1984 document.

*Primary Examiner*—Aristotelis M. Psitos
*Attorney, Agent, or Firm*—Lewis H. Eslinger; Jay H. Maioli

[57] ABSTRACT

Audio signals that correspond with still images are recorded in an electronic still camera on the same magnetic disc as the visual images. By time-base compressing the audio signal and dividing each record track into a number of segments, ten seconds of audio can be recorded for each image without requiring a large processor memory. Identification codes are added to the time-base compressed audio to permit multiple audio tracks to be associated with a recorded image and to record audio signals of time length less than the allotted duration, so that a number of images can be recorded in rapid succession without waiting for each of the successive allotted audio time periods to expire.

13 Claims, 9 Drawing Sheets

APPARATUS FOR RECORDING REPRODUCING A STILL IMAGE AND CORRESPONDING AUDIO INFORMATION IN RESPECTIVE TRACKS ON A DISK WITH THE AUDIO COMPRESSED ON SEGMENTS OF A TRACK

BACKGROUND OF THE INVENTION

1. Field of the Invention

The present invention relates to a recording and/or reproducing apparatus for still images, such as those known as electronic still cameras and, more particularly, to electronic still cameras capable of recording an audio portion in association with the still image or scene.

2. Description of the Background

There are now known electronic still cameras that have in place of the conventional silver halide film a solid-state image pickup device, such as a charge coupled device, or CCD, for recording a still image or scene on a magnetic record disc. One example of such electronic still camera is found in British Patent Publication No. GB212603A. The still camera described in this British Patent Publication is designed so that one-field or one-frame of the video signal from the image pickup device is taken during the time that the shutter is opened, which means the signal corresponding to the one-frame is recorded on one complete annular track of a magnetic disc.

In the unit intended for reproducing the images recorded by such electronic still cameras, the video signal of the recorded still image or scene is formed by repeated reproduction of one track, or repeated alternate reproduction of two tracks in the format in which only a single field is recorded on each track, two fields making up a frame. Such reproduced video signals then are supplied to a television monitor or television receiver for reproducing the still images on the cathode ray tube screen. Additionally, a so-called video printer has also been proposed for printing a hard copy of the image recorded by the electronic still camera.

Further proposals that have been made relative to the electronic still camera involve a provision of recording ambient sounds or human voice narration associated with the still image or scene that is being recorded. A workable length for such audio material has been found to be approximately ten seconds. In recording such audio signals, the recording system used for the video signals may be used by compressing the audio signals along the time axis using, for example, digital signal processing, thereby elevating the bandwidth of the audio signals to that of the video signals. For example, using such time-base compression an audio signal having a bandwidth of 5kHz, can be compressed along the time axis by a factor of 600 to raise the bandwidth of the signals to the video signal bandwidth, such as 3MHz, so that audio signals can be recorded having a time duration of about ten seconds, which is about 600 times the duration of one field period which is typically equal to 1/60th of a second. This technique in theory works fine except that an extremely large capacity memory device is required if ten seconds worth of audio signals must be digitally processed in the manner as described above.

Accordingly, it has been proposed to divide the ten second period corresponding to the desired audio program length into four equal parts of 2.5 seconds duration each, and then to digitally process these individual parts in order to reduce the required memory capacity. Each of the quadrisectioned, time-axis compressed, continuous audio signals is sequentially and continuously recorded on each of the four sectors or segments obtained by dividing a given track on the magnetic disc into four equal sections. Nevertheless, while recording the series of video signals on the four segments of one track solves one problem, other problems are presented by this approach. For example, when the continuous audio signals are divided into a number of portions or segments, it becomes difficult to maintain signal continuities between the successive segments at the time of reproduction. Also, in similar situations when the audio signals are recorded in a plurality of successive tracks, in cases where the audio signals have a duration longer than ten seconds, it becomes difficult to maintain signal continuities between the successive tracks during reproduction. Also, when the audio signals are recorded for only two seconds, for example, on a track capable of recording audio signals of a ten second duration, the remaining eight second period will be void of signals, however, it is still necessary to perform the audio reproducing operation for the entire ten seconds of the track in order to reproduce only the two seconds of audio signals recorded thereon. Furthermore, because the audio signals associated with the next successive image or scene can be recorded only at intervals of ten seconds, it is not possible during continuous shooting to record the sound or voice associated with each scene of the continuous series. Similarly, when the audio signals are recorded over a plurality of tracks, it is difficult to distinguish the image track from the audio track so that the sound or voice is not always produced in association with the appropriate scene.

OBJECTS AND SUMMARY OF THE INVENTION

Accordingly, it is an object of the present invention to provide a signal recording and/or reproducing apparatus that can eliminate the above-noted defects inherent in the prior art.

Another object of this invention is to provide a signal recording and/or reproducing apparatus that can maintain signal continuities between segments of audio program material recorded on a single track.

A further object of the invention is to provide a signal recording and/or reproducing apparatus that can maintain signal continuities between the audio portions recorded in more than one track at the time of signal reproduction.

A still further object of the present invention is to provide a signal recording and/or reproducing apparatus that eliminates the requirement to continue an audio reproduction operation when there is no material recorded at that position on a track, thereby making it possible to reproduce the sound or voice in association with the actual image being displayed.

Another object of the present invention is to provide a signal recording and/or reproducing apparatus that is more versatile in recording sound and voice material with electrically recorded images than that known heretofore.

In accordance with an aspect of the present invention, signal recording and/or reproducing apparatus is provided wherein one-field video signals are sequentially recorded on each selected one of a plurality of concentrically arranged tracks and wherein audio signals are compressed along the time axis and recorded in place of the video signals in selected ones of the concentrically arranged tracks, such that the audio signals are divided into plural signal sections which are time-base compressed and recorded as segments using a memory having a capacity less than the equivalent time duration in which the audio signal section is continuously recorded. Start identification signals and end identification signals are introduced respectively at the leading and trailing edges of the time-base compressed audio signal sections, and these start and end identification signals are used at the time of reproduction to expand the signal and to annex the ends of the successive compressed signals one to another.

In another aspect of the present invention, a signal recording apparatus is provided in which a series of one-field video signals are sequentially recorded on each selected one of a plurality of concentrically arranged tracks, wherein each selected one of the remaining tracks is divided into plural segments in which audio signals are compressed along the time axis and recorded in selected ones of such divided segments. In such embodiment, start identification signals and end identification signals are inserted at the leading and trailing edges, respectively, of the time-compressed audio signals recorded in the segments and control code data is also inserted at the trailing edges of the start identification or end identification signals and being separated by a predetermined time interval from such trailing edges. The control code signals are employed to control the operation of the reproducing apparatus during reproduction of the recorded audio signals.

In the present invention, the start and end identification signals are inserted at the leading and trailing portions of the segments, respectively, and are used to provide easy and positive annexation of the respective adjoining segments in a track. Nevertheless, these start and end identification signals can also be used to accomplish easy and accurate annexation of the signals in adjoining adjacent tracks, as well as annexation of the adjoining segments in such tracks. Additionally, the control code data signals that are recorded with the respective audio signals can be employed to preclude performing the reproducing operation when it is not required. Use of the present invention can also provide for stereophonic or bilingual reproduction, as well as correctly matching reproduction of the sound or voice matched to the appropriate scene, as will be described hereinbelow.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIGS. 1-A and 1-B are diagrammatic representations of waveforms showing signal formats for sound or voice signals recorded according to the present invention;

FIG. 11-A is a plan view of a magnetic recording disc diagrammatically representing signals recorded on one track in a continuous shooting format;

FIG. 11-B is a plan view of a magnetic recording disc showing the signal format of the signals as recorded in FIG. 11-A;

DETAILED DESCRIPTION OF PREFERRED EMBODIMENTS

Figure 1:
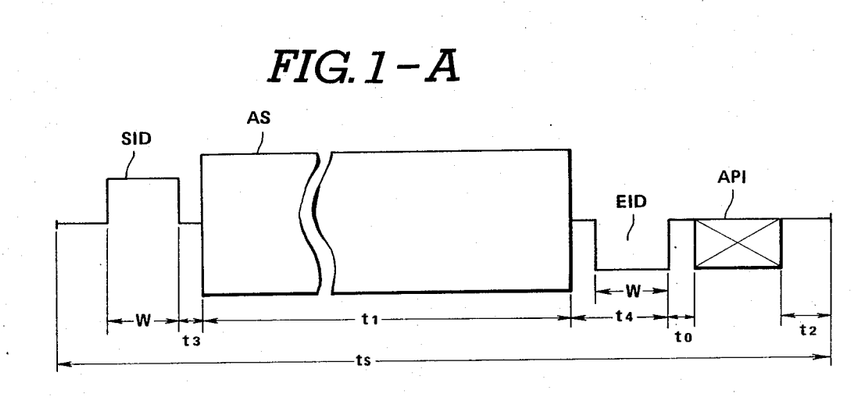
Figure 2:
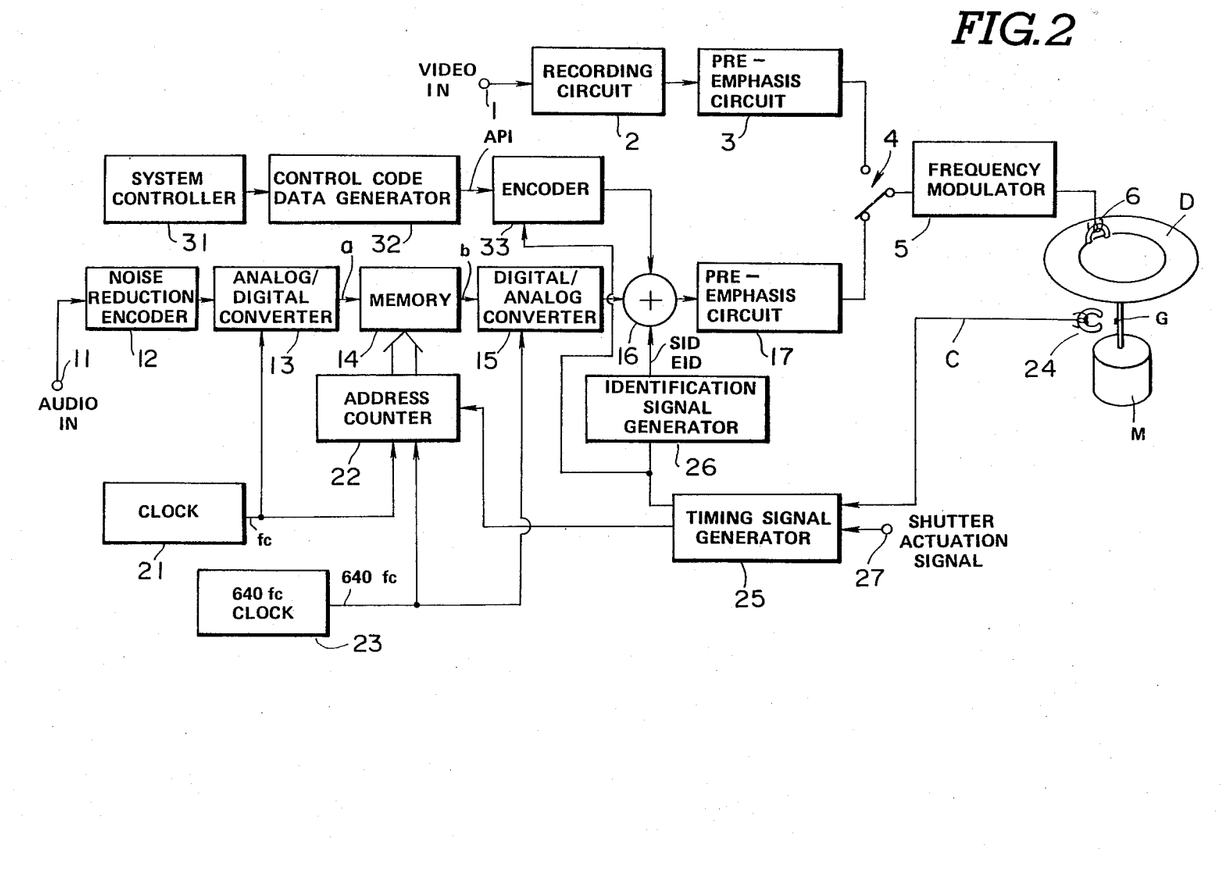
FIG. 2 is a schematic in block diagram form of a recording system for recording signals such as represented in FIGS. 1-A and 1-B.

FIGS. 1-A and 1-B diagrammatically represent formats for the audio signals recorded on each segment of a track on a magnetic disc according to the present invention, as might be recorded using a recording system such as that shown in FIG. 2.

Referring then to FIG. 2, video input signals from a CCD sensor or the like (not shown) are fed in through input terminal 1 to a recording circuit 2 that may generally comprise the known low-pass filters, automatic gain control, clamps, and the like, in order to process the video signals into signals appropriate for recording. Such recording signals are then fed from recording circuit 2 to a non-linear pre-emphasis circuit 3 and then to one terminal of a change-over switch 4. When change-over switch 4 is in a position other than as shown in FIG. 2, the signals from pre-emphasis circuit 3 are fed to a frequency modulator 5, where they are processed into the appropriate FM signals to be recorded on a magnetic disc D by a known recording head 6. Magnetic disc D is driven for rotation by electric motor M at a rate of, for example, 3600 rpm. Such system for recording video signals is seen not to involve anything extraordinary in view of what is known in electronic still cameras at this time.

On the other hand, the audio signals are supplied through input terminal 11 from a suitable microphone or the like (not shown) to a noise reducing encoder 12 and then to an analog-to-digital (A/D) converter 13. The digitally converted signals are then fed to a memory 14, where they are written thereto in accordance with addresses that are produced in a fashion to be described below. The contents of memory 14 are read out to a digital-to-analog (D/A) converter 15 wherein they are converted back into corresponding analog signals. Sampling signals for the analog-to-digital conversion accomplished in A/D converter 13 are provided by an oscillator or clock 21 at a frequency represented at $f_c$ for audio signals having a typical bandwidth of approximately 5 kHz. The audio sampling signal $f_c$ is also fed to an address counter 22, which is provided to drive or control memory 14 by providing the appropriate addresses for the digitally converted signals fed thereto. While the audio signals are sampled at a rate $f_c$ when they are converted from analog to digital, when they are converted back to analog signals they are sampled at a frequency that is 640 times that of the sampling signal $f_c$. Accordingly, a second oscillator or clock 23 provides clock signals having a frequency 640 $f_c$ to digital-to-analog converter 15, as well as to address counter 22. Of course, it is appreciated that the read-in addresses to memory 14 being provided by address counter 22 correspond to the basic clock frequency $f_c$ and the read-out addresses for the signals fed to digital-to-analog converter 15 that are provided by address counter 22 are in response to the higher clock frequency 640 $f_c$ from clock 23.

Signals representing the rotational phase of disc D, which is being rotated at 3600 rpm by motor M, are provided by a pick-up head 24 that senses a rotating magnetic element G affixed to the shaft of motor M and are fed to a timing signal generator 25 that produces pulsed signals having a pulse period of approximately 1/60th of a second and that are related to the rotational phase of the disc D and fed to an identification signal generator 26. The same pulsed signals are also fed to address counter 22. Timing signal generator 25 also receives at input terminal 27 a signal generated upon the actuation of the shutter button (not shown).

Figure 3:
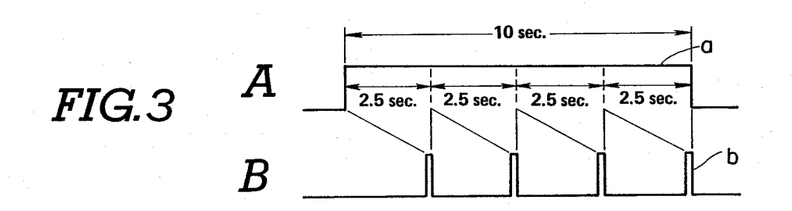
FIG. 3, A and B are, timing charts showing the time-base compression of audio signals according to the present invention.

Accordingly, it is seen that the audio signal that is output from analog-to-digital converter 13 is fed to or written into memory 14 at a rate based on signal $f_c$ from clock 21 that is converted into addresses by address counter 22 operating in the known manner. The timing frequencies are chosen so that audio signals a are written into memory 14 each 2.5 seconds, as represented at A in FIG. 3. This 2.5 second period is chosen as being one-fourth of the ten second period representing the desired audio signal program length and corresponds to one segment or sector of a complete ten second audio track on a magnetic record disc. Now, because second clock 23 produces a signal having a frequency much greater than the write-in frequency $f_c$, the signals b are read-out from memory 14 in response to the signals from clock 23, as represented at B in FIG. 3, at a rate 640 times that used for the writing-in operation. In other words, audio signals having a duration of 2.5 seconds are compressed along the time axis to 1/640th. This corresponds to a time of 2.5/640=3.9 milliseconds. The audio signals thus compressed in the time-base domain correspond to the audio signals AS and AS' shown in FIGS. 1-A and 1-B, respectively and during this signal read-out operation from memory 14, the audio signals $AS_A$, $AS_B$, $AS_C$, $AS_D$ corresponding, respectively, to the four segments on a track of disc D, which will be described in detail hereinbelow, are read out at intervals of 2.5 seconds and are sequentially out of phase or dephased by ¼ of a period or 1/240th of a second based upon the pulsed timing signal c having a 1/60 second period as provided from pickup head 24. Timing signal c is shown at A in FIG. 4 and the relative phase relationship of the other audio signals recorded in the respective segment of the track are shown at B through E of FIG. 4.

Now, the audio signals that have been described above are read-out from memory 14 and converted from digital form in D/A converter 15 are fed to a signal mixer 16 that also receives start identification signals SID and end identification signals EID, which are generated in the identification signal generator 26 in accordance with the pulsed timing signals provided by timing signal generator 25 that produces such signals based upon the disc rotation speed as sensed by sensor 24 cooperating with magnetic element G on the shaft of motor M. The respective positions of the start identification signal and end identification signal relative to the audio portion are shown in FIGS. 1-A and 1-B. Mixer 16 also has supplied thereto an output from an encoder 33 that has input thereto control code data API generated by control code data generator 32 based upon control signals that are supplied from a system controller 31 that is used to control the reproducing operation of the recorded audio signals.

FIG. 1-A shows the signal arrangement produced by mixing these additional signals with the audio signals. More specifically, FIG. 1-A represents one segment of the signal having an overall time duration $t_s$ that is comprised of audio signal AS compressed along the time axis, a start identification signal SID arranged preceding the leading edge of audio signal AS, an end identification signal EID following the trailing edge of audio signal AS, and the control code data signals API following the end identification signal by a predetermined time interval $t_O$. The present invention provides a signal format such that when the time duration $t_s$ of the audio signal AS is less than a predetermined time interval equal to 2.5/640 of a second, the EID signal and the control code data signal API are correspondingly advanced in time, toward the left in the time scale shown in FIGS. 1-A and 1-B. Such time advance is shown having been effected in FIG. 1-B. Upon shifting the EID signal and API signals in time, the corresponding trailing portion $t_2'$ following the API signal will then be longer. Nevertheless, the sum of the time intervals $t_1'$ of the audio signal AS' and the time interval $t_2'$ following control code data API will be constant, that is, the sum will be equal in both of the cases represented in FIGS. 1-A and 1-B.

It is, of course, a requirement that the identification signals, both start and end, must be able to be distinguished not only from each other but also from the audio portion recorded in segment $t_s$. This is achieved according to the present invention by selecting the time duration W of the start identification signal and the end identification signal to be greater than the time duration of a pulse corresponding to the minimum frequency of the time-base compressed audio signal AS. The two identification signals SID and EID are distinguished from each other by making the start identification signal SID have a positive polarity and employing the falling edge thereof as the detection reference and making the end identification signal EID have a negative polarity and employing the rising edge as the detection reference. By employing different combinations of the polarities of the start and end identification signals, SID and EID, it can then be determined whether the control code data portion API of a given segment is at the foremost, rearmost, or mid-portion of a given track on a disc, or even if such control code data portion extends onto the next track.

In regard to the control code data API, this data is formed of a number of bits, for example, 64 bits, that are allocated to various data such as track address, the leading end of succeeding addresses of a continuous sound or voice, an address of the corresponding image or scene, the time compression ratio mode, the segment use state, or data relative to the actual recording. The track address data can be employed to indicate the absolute address of the track containing the recorded signals. The track leading address data of the continuous sound or voice can be employed to indicate the address of the leading track in the situation where the sound or voice is recorded on a plurality of tracks and, similarly, the succeeding address data of the continuous sound or voice can be employed to indicate the address of the track to be reproduced the next successive time. The time compression ratio mode data is employed to indicate the compression ratio employed in time-base compressing the audio signal, examples of such compression ratio being 1/640 or 1/1280. The segment use state data indicates the use state of each of the four segments, for example, stereo mode, bilingual mode, or the like. It is noted that the same control code data API is recorded in all segments $S_A$, $S_B$, $S_C$, $S_D$ of one track.

The output signal from mixer 16 is fed to a linear pre-emphasis circuit 17 and the emphasized signal is fed to the other contact of change-over switch 4, which connected as shown in FIG. 2 provides the pre-emphasized analog signal to frequency modulator 5, where it is converted into the appropriate FM signals for recording and is then recorded on disc D by magnetic head 6. Change-over switch 4 is operated by the overall system control unit (not shown) in a conventional fashion.

Figure 4:
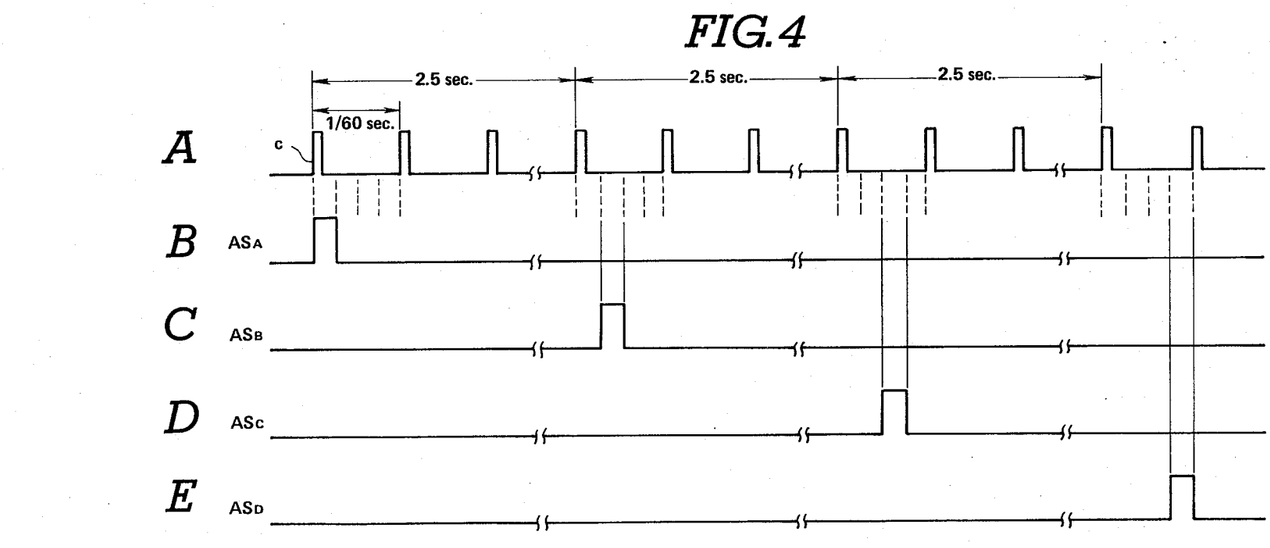
FIG. 4, A through E, represent signal waveforms showing the timing of the audio signals written into a memory according to the present invention.
Figure 5:
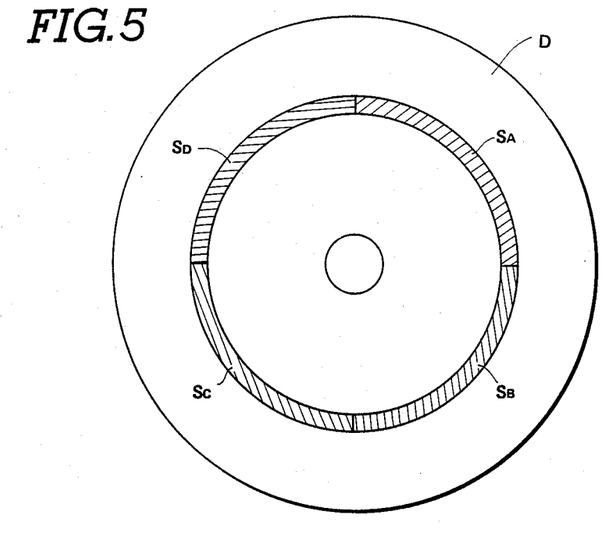
FIG. 5 is a plan view of a magnetic recording disc showing the quadrisectioned segments of a single track.
Figure 6:
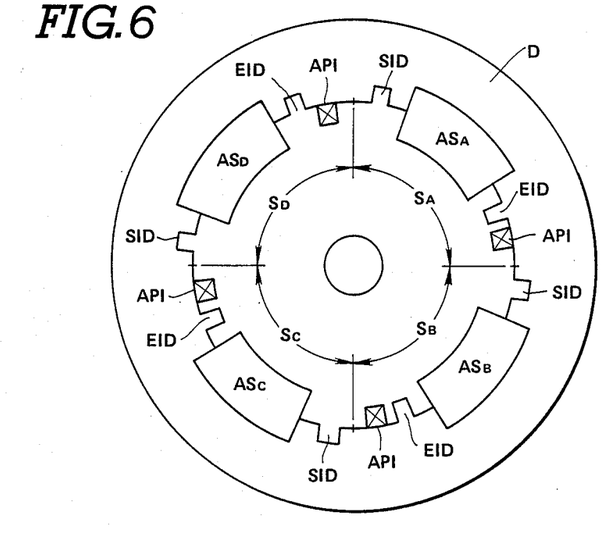
FIG. 6 is a plan view of a magnetic recoding disc schematically representing the audio signals recorded in each segment of a track.

FIG. 4 shows the four segments of the audio signal $AS_A$, $AS_B$, $AS_C$, $AS_D$ and each of these four signals when combined with the respective identification signals SID and EID and the control code data API that are annexed thereto, provides a duration of 2.5 seconds and is recorded in the four, equal-length segments $S_A$, $S_B$, $S_C$, and $S_D$ on disc D, respectively. The positions of the four segments of disc D are represented in FIG. 5 and in FIG. 6 a diagrammatic representation of the actual signal format for each of the four quadrants of the selected track are shown in detail.

Figure 7:
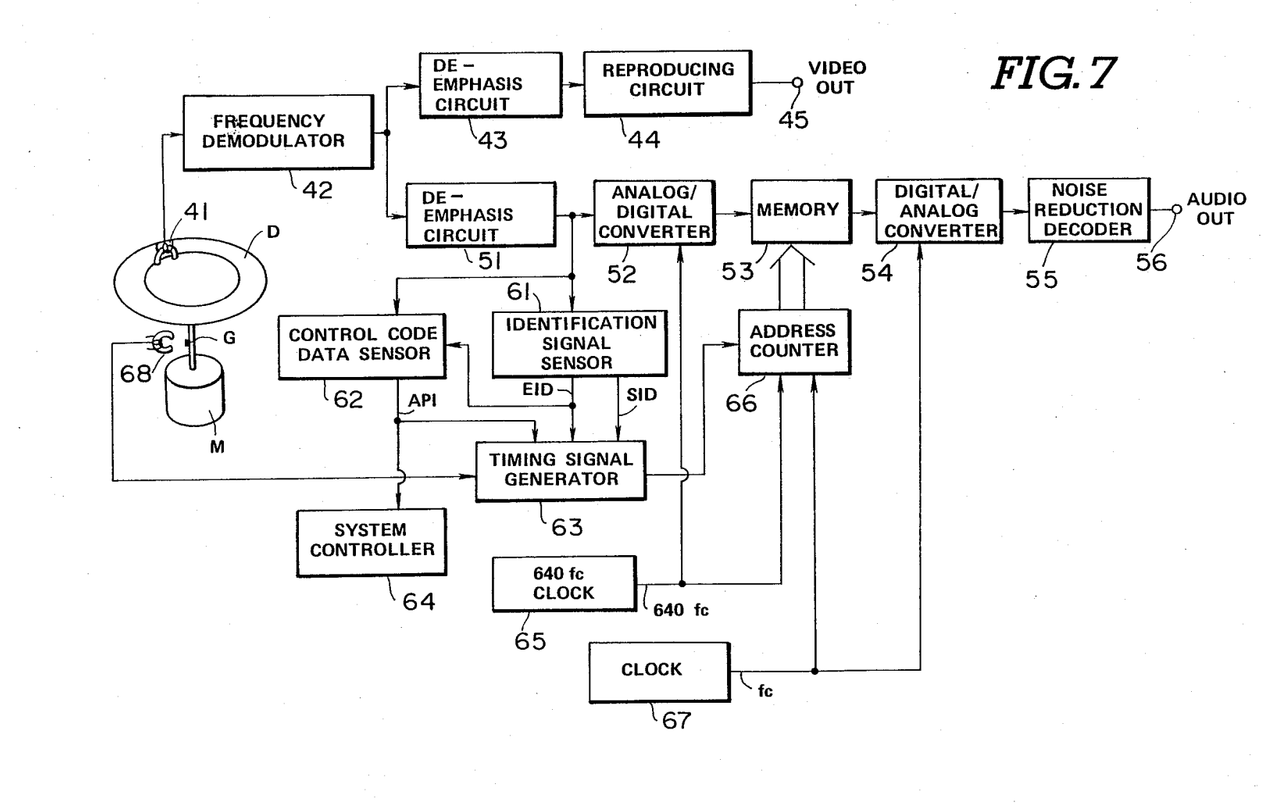
FIG. 7 is a schematic in block diagram form of a reproducing system according to the present invention.

An embodiment of a system according to the present invention for reproducing audio signals recorded by apparatus such as shown in FIG. 2 is represented in FIG. 7, in which signals recorded on disc D are reproduced by magnetic head 41 and fed to a frequency demodulator 42. When magnetic head 41 is scanning a track of disc D on which video signals have been recorded, the frequency modulated video signals are fed to a nonlinear de-emphasis circuit 43 and then to a reproduction circuit 44, before being fed out at video output terminal 45. It is understood, of course, that reproduction circuit 44 contains the typical circuitry corresponding to that in recording circuit 2 of FIG. 2. When magnetic head 41 is scanning a track on disc D in which audio signals have been previously recorded, the frequency demodulated signals are then fed to a linear de-emphasis circuit 51 and the de-emphasized signals are fed to an analog-to-digital converter 52 (A/D). The separation of these signals can be accomplished by a change over switch (not shown) or by various filtering networks or the like.

The de-emphasized signal from linear de-emphasis circuit 51 is also fed to an identification signal sensor 61 and to a control data sensor 62. Identification signal sensor 61 operates to detect the start identification signal SID and end identification signal EID, which are both fed to a timing signal generator 63 and the end identification signal EID is also fed to the control code data sensor 62. Control code data sensor 62 operates to separate or sense the control code data API, and the resultant signal is fed to timing signal generator 63 and also to a system controller 64, which operates in the known fashion to control the overall system. As noted above, the control code data API contains information relevant to the various operations of the overall system. The digitally converted, reproduced signals from A/D converter 52 are written-into memory 53, and the corresponding output signals that are read-out from memory 53 are subsequently reconverted to an analog signal in a digital-to-analog converter 54 and then fed to a noise reducing decoder 55 before being ultimately made available at audio output terminal 56. As in the recording system, the manner in which the signals are written-into and read-out of memory 53 is important. Thus, the signals having a frequency 640 $f_c$, similar to those produced by clock 23 in the recording system of FIG. 2, are fed from an oscillator or clock 65 to A/D converter 52 and are also fed to an address counter 66, which operates or controls operation of memory 53. Of course, because time-base expansion is required, a second clock 67 produces a clocking signal having a base frequency $f_c$ that is the same frequency as that of clock 21 in the system of FIG. 2 and which is equal to 1/640th of the frequency of the signal provided by clock 65. Signals having a frequency $f_c$ from clock 67 are fed to address counter 66 and also to D/A converter 54. System synchronization or overall timing is also provided by timing signals generated in timing signal generator 64 based upon the pulsed signals provided by the timing signal generator 63 that have a period equal to 1/60 second provided to address counter 66. Motor timing signals are provided from the magnetic element G on the motor shaft, as sensed by a sensor 68 producing a signal c such as shown at waveform A in FIG. 4.

In operation then, when the falling edge of the start identification signal SID is sensed and a signal fed to timing signal generator 63, the signal for writing into memory 53 is started after a time period $t_3$ has elapsed, as shown in FIG. 1-A. Address counter 66 then controls memory 53 for writing-in of the digital signal based upon the frequency of the signal output by clock 65. The writing-in operation is discontinued as soon as the end identification signal EID is sensed and signals are read-out from memory 53 under control of address counter 66 in response to the clock signal from clock 67 that has a rate 1/640 times that of the writing-in signal. In other words, the use of the two clock signal generators having different respective frequencies permits the audio signals to be expanded 640 times along the time-base axis so as to be restored to their original length by the reverse of the time-base compression procedure used during recording.

As a further feature of the present invention, the writing-in operation to memory 53 is terminated by the end identification signal EID and the address of memory 53 is then counted down by a number corresponding to time interval $t_4$, as represented in FIGS. 1-A and 1-B. This counting down operation is repeated in each segment in order to discard data that may have occurred during time $t_4$, so that only the actual audio signals AS of the respective segments are continuously written into memory 53. Also in this embodiment, when there is an overlap in contents of the audio signals of the respective segments, that is, when the same data has been recorded for example at the trailing portion of audio signal $AS_A$ and the leading portion of audio signal $AS_B$, it is necessary that the address of memory 53 be counted down by a number corresponding to the time interval $(T_4+a)$ where "a" represents the time of overlap of the signal portions. This operates to preclude generation of any signal discontinuities that might have been caused by jitter components, for example.

Figure 8:
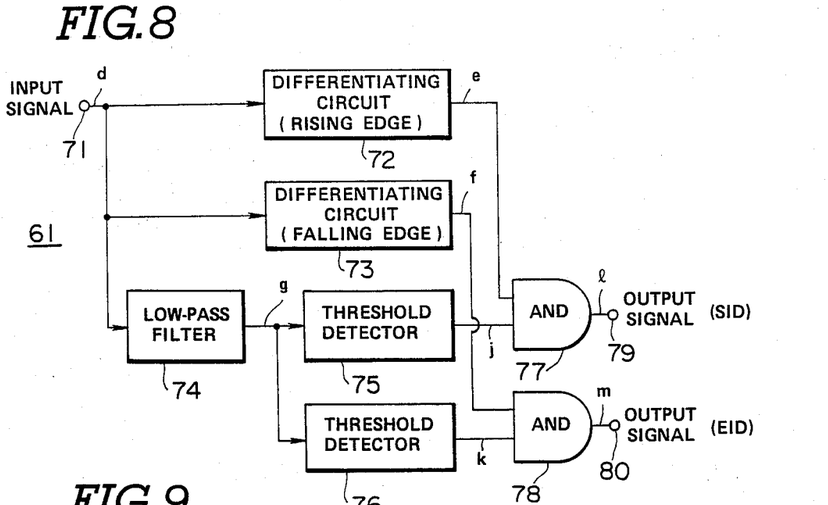
FIG. 8 is a schematic showing the signal identification sensor of FIG. 7 in more detail.
Figure 9:
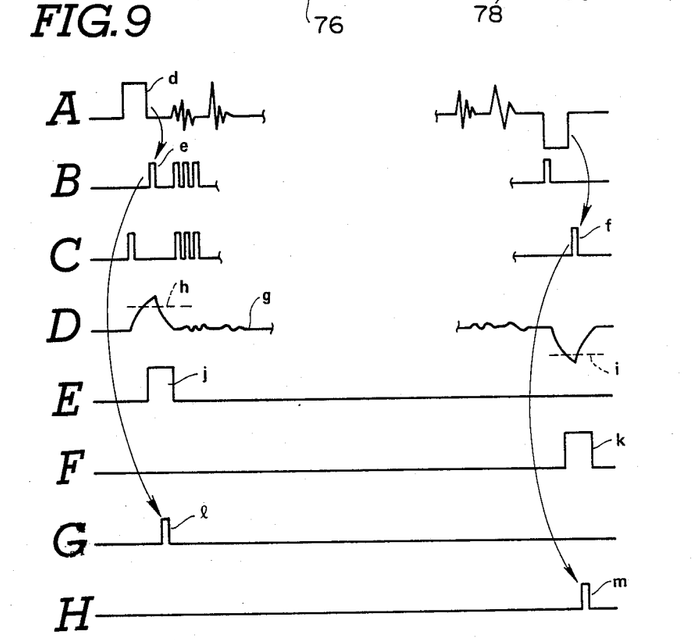
FIG. 9, A through H, represent signal waveforms showing the timing of the operation of the sensor of FIG. 8.

Identification signal sensor 61 is shown in more detail in FIG. 8 and the waveforms of the signals occurring at several locations in FIG. 8 are shown in FIG. 9. More particularly, the waveform d shown at A in FIG. 9 represents the signal fed in at input terminal 71 to a first differentiation circuit 72 that senses the falling edge of the signal. This signal d is also fed to a second differentiating circuit 73 that senses the rising edge and is also fed to a low-pass filter 74.

Referring then to FIG. 9, the input waveform of signal d at terminal 71 is shown at A and B represents the output e of first differentiating circuit 72. Second differentiating circuit 73 operates to sense the rising edge and produces output signal f shown at C, and the output g of low-pass filter 74 is shown at D. The output signal g is fed to two comparator circuits 75 and 76 which operate as threshold detectors relative to the thresholds represented by dashed lines h and i, respectively, at D of FIG. 9. The output signals of j and k threshold detectors 75 and 76 are fed to logical AND circuits 77 and 78, respectively, and the waveforms of these signals from threshold detectors 75 and 76 are shown at E and F of FIG. 9. Also input to AND circuits 77 and 78 are the output signals from differentiating circuits 72 and 73, respectively, and the falling edge of the start identification signal SID is sensed by AND gate 77, so that an output signal is produced therefrom at SID terminal 79 and an end identification signal is produced by AND gate circuit 78 at EID terminal 80. The waveform of the output signal of AND gate 77 is shown at G, and the output signal m of AND gate 78 is shown at H in FIG. 9.

Figure 10:
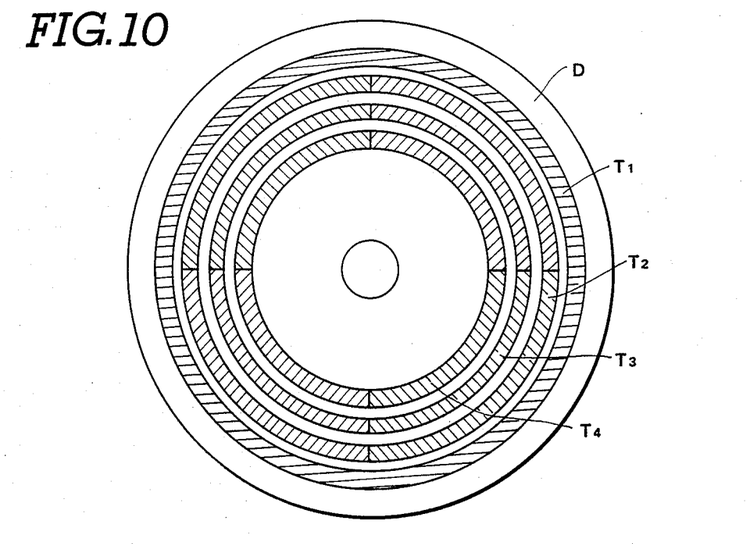
FIG. 10 is a plan view of a magnetic recording disc diagrammatically representing audio signals recorded across a plurality of tracks.

As indicated generally above, the control code data API is intended to control the reproduction operation of the audio signals and typically comprises various data such as track address, leading and succeeding addresses of the continuous sound or voice signals, the address of the corresponding image or scene, the time compression ratio mode, the segment used to state the date, and the like. Thus, by recording the control code data API in each segment along with the audio signal, when the audio signals are recorded across plural tracks the video and audio tracks can be distinguished from each other during reproduction, so that the sound or voices associated with the image or scene can be reproduced appropriately. For example, as shown in FIG. 10, when the video signals are recorded in track $T_1$ and the corresponding audio signals are recorded tracks $T_2$, $T_3$, and $T_4$, then track addresses 2 through 4, the address of the corresponding video image 1, the leading address of the continuous voice or sound, and the succeeding addresses of the continuous voice or sounds may be simultaneously recorded on each of the four tracks as the control code data API. Assuming the subscripts to be the address then, the leading address of the continuous voice for each of the tracks $T_2$-$T_4$ is "2" and the succeeding addresses for the tracks $T_2$,$T_3$ and $T_4$ are "3", "4" and "0", respectively. Thus, magnetic head 41 can be shifted in the order of tracks $T_2$,$T_3$ and $T_4$, during reproduction of the typical disc represented in FIG. 10.

By setting the succeeding addresses of tracks $T_4$ to "2", the audio signals recorded in tracks $T_2$-$T_4$ can be continuously reproduced end to end.

Figure 11:
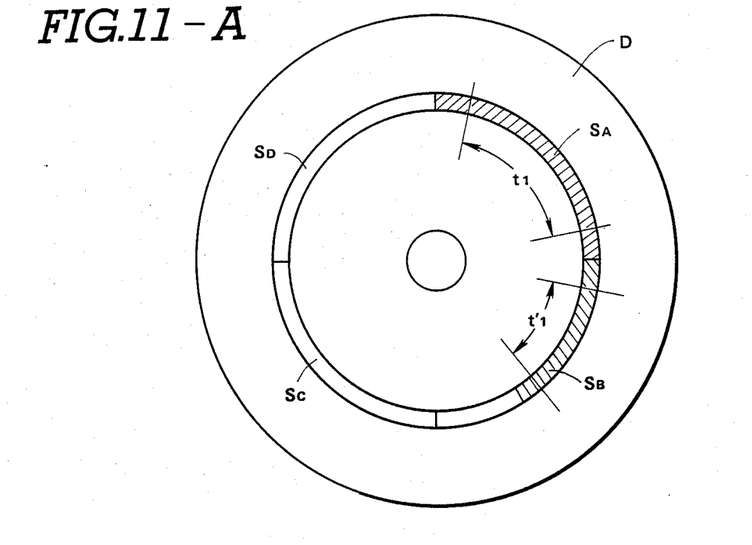

In the situation in which continuous shooting is desired, that is, a situation involving picture taking in which the contents of the audio signals are terminated within, for example, 2.5 seconds and the entire 10 seconds allocated are not employed, audio signals corresponding to the respective images or scenes can still be recorded and reproduced. In that case, the audio signals $A_S$,$A_B$, corresponding to a scene may be recorded on segment $S_A$ and on a portion of segment $S_B$ that is consecutively arranged relative to segment $S_A$. The remaining segments $S_C$ and $S_D$ are then considered to be dummy segments. On the portion of segment $S_B$ that is adjacent termination of the audio signals $AS_B$, there is recorded the end identification signal EID and the control code data API. The track address, address of the corresponding scene, and, in the situation where the sound of voices is continuously recorded across plural tracks, the leading and succeeding addresses of the continuous sound of voice are recorded as control code data API in the respective segments $S_A$ to $S_D$. Thus, during reproduction, magnetic head 41 is shifted to reproduce the track of the next image or scene at the instant the end identification signal EID and control code data API are sensed. This signal recording state can be used not only for continuous shooting but also for normal picture taking, wherein the sound or voice corresponding to one scene has a duration of less than 10 seconds. The result is that any useless reproducing operation is precluded.

The present invention also contemplates the provision of stereophonic recording or reproduction by allocating segments $S_A$ and $S_C$ of the four segments of a given track to a right channel and allocating the segments $S_B$ and $S_D$ to the left channel. Similarly, bilingual recording or reproducing can also be performed by allocating segments $S_A$ and $S_C$ to Japanese, for example, and segments $S_B$ and $S_D$ to English. Also, segments $S_A$-$S_D$ can be separately used for four-channel recording or reproduction, in which case one of the control data API, that is, the segment using the status data, will have a different format from that used for recording continuous sound or voice of the respective segments.

Although a specific example for the time based compression ratio was described above, the audio signal compression ratio can be twice that of the described ratio, that is, a compression ratio of 1/1280 can be used, which then makes possible a recording time on one track of up to 20 seconds. In that case, one of the control code data, such as the time compression ratio mode data will have a different format from that employed with the compression ratio of 1/640. As a further variation, the control code data API can be placed directly after the start identification signal SID, instead of after the end identification signal EID, as in the preceding embodiment yet still retain all of the advantageous features of that embodiment.

Figure 12:
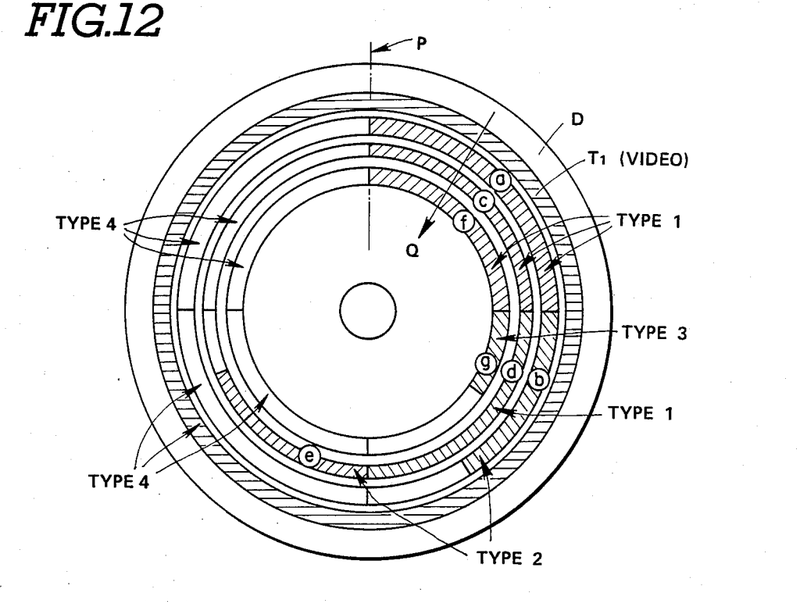
FIG. 12 is a plan view of a magnetic recording disc diagrammatically representing a modification of the recording format in FIG. 10.

Referring now to FIG. 12, when the audio signals are recorded on plural consecutive tracks in the order a through g as shown in FIG. 12, these identification signals SID and EID are selected to have specific polarities so that with track head arranged at P and a scanning or sequence direction of the head shown at arrow Q, there are four types of sectors or segments possible that can be defined by the following:

Each type of sector indicated above can then be represented by the following table:

| Sector Type | Comments | Polarity of Start flag (SID) | Polarity of End flag (EID) |
|---|---|---|---|
| Type 1 | The sector contains audio signal. The next sector on the same track contains the succeeding audio signal. | High level | Low level |
| Type 2 | The sector contains audio signal. The succeeding audio signal is contained in sector #0 on another track. | High level | Low level |
| Type 3 | The sector contains audio signal. The sector is the last sector of the sequence. | High level | High level |
| Type 4 | The sector does not contain audio signal. The sector shall not be reproduced. | Low level | High level |

Figure 13:
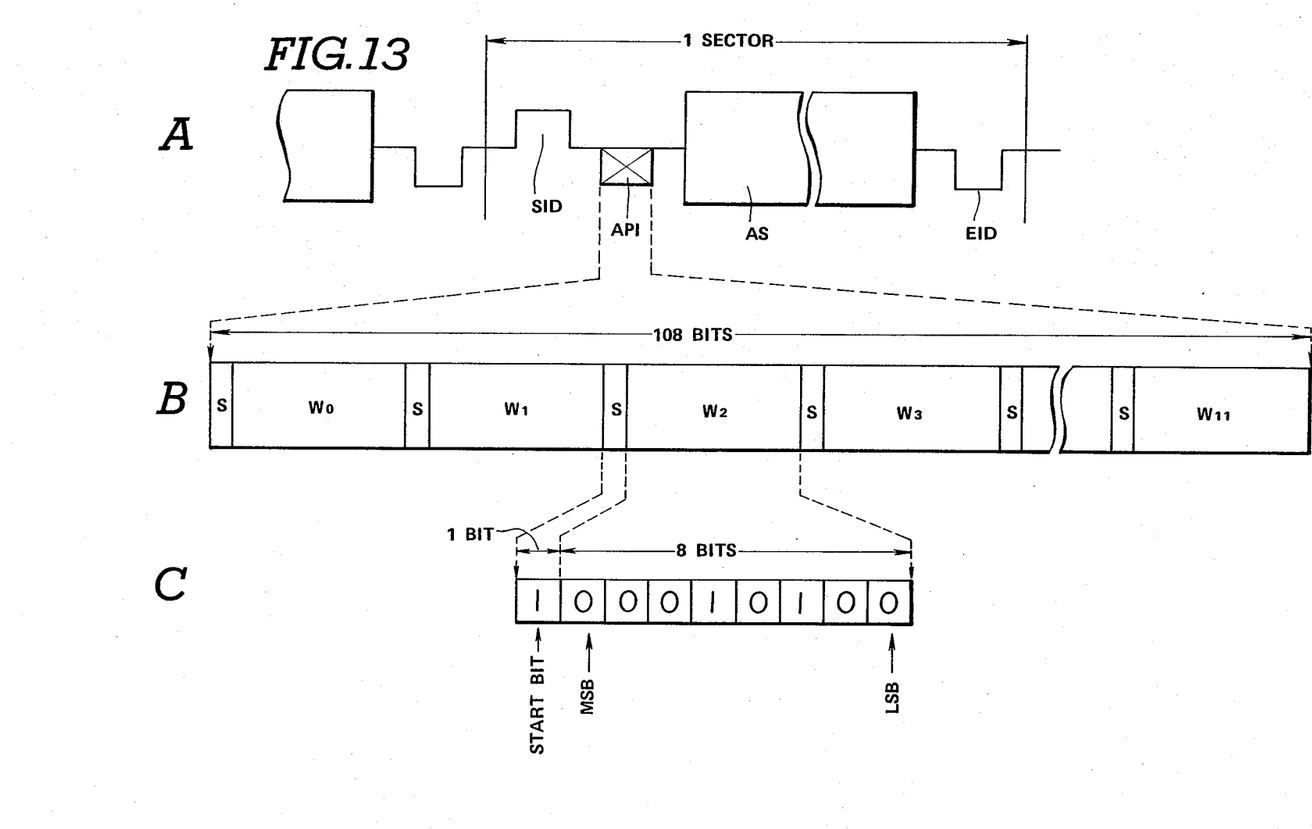
FIG. 13, A through C, are diagrammatic representations of signal formats employing a controlled code data according to the present invention.

The content of the control code data API is shown in more detail in FIG. 13 and, more particularly, the relationship between the plural consecutive tracks on which the complete and consecutive audio signals are recorded end to end, as represented, for example, in FIGS. 10 and 12. The waveform at A in FIG. 13 corresponds generally to that shown in FIG. 1-A and in a practical embodiment after modulation using the non-return-to-zero (NRZ) modulation technique, the control code data API are frequency modulated as are the audio data AS. The control code data API is allocated as represented at B in FIG. 13 and comprises nine data words, $W_1$ through $W_9$, a cyclical redundancy check code (CRC) consisting of two words, $W_{10}$ and $W_{11}$, a sync code consisting of one word $W_0$, and a total of twelve start bits S, one preceding each of the words of the API code. Each of the words in the control code data API is an eight-bit word represented at C in FIG. 13, and the start bits and sync code $W_0$ are employed as sync data in the data reproduction mode. Word $W_1$ designates its own track number, that is, the number of the track being reproduced, and $W_2$ designates the track number of the audio track containing the first sector of the sequence, word $W_3$ designates the track number of the audio track containing the next sector of the audio sequence, and word $W_4$ designates the track number of the corresponding video track. Word $W_5$ is retained as a reserved data area, and word $W_6$ designates the data area indicating the time compression ratio of the audio signal. Words $W_7$ through $W_9$ designate areas indicating the date, that is, the day, month, and year. Word $W_6$ indicating time compression ratio is adapted so that the time-base compression ratio of the audio signal can be set at 320, 640, or 1280 in the case of recording the video signals in the NTSC format or can be set to 272, 544, or 1088, in the case of recording video signals in the PAL format.

In that regard, the carrier frequency of the time-base compressed audio signals for the NTSC format having 525 lines per 60 fields is set to be equal to $6\pm0.15$ MHz, whereas that for the PAL format with 625 lines per 50 fields is set to be equal to $5\pm0.12$ MHz. It is seen that according to the present invention, an arrangement by which start and end identification signals are located at leading and trailing edges of each segment so that the reproduced signals can be easily annexed one to another, thereby providing for optimum signal continuity. Also, because the start and end identification signals, as well as the control code data, are provided to control the reproduction operation of the audio signals recorded in each segment of the disc, along with the audio signals being time compressed along the time base axis, useless reproducing operations are avoided even in cases where the audio signal recorded in a track is less than the available duration of the track. Thus, the sound or voice can be matched to the scene that is being reproduced in instances where the sound and voice is recorded on a number of plural and consecutive tracks or in the case of continuous shooting. Also, the present invention can provide an accompanying sound or voice track to still pictures in stereophonic sound or for bilingual reproduction.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. Apparatus for use with an analog signal recording and reproducing system of the kind wherein a field of a video signal representing a still image is recorded on a selected one of a plurality of concentrically arranged tracks on a rotary record medium and an audio signal associated with the still image is recorded on another concentrically arranged selected track of the record medium, the apparatus comprising:
   means for recording a field of the video signal representing a still image;
   means for dividing an audio signal having a known length and associated with the recorded still image into a plurality of audio signal segments;
   means for time-base compressing each of said plurality of audio signal segments and including a memory having a predetermined memory duration capacity at a selected clock frequency that is less than said known length of said audio signal associated with the recorded still image;
   means for generating segment start and end identification signals for each of said time-base compressed audio signal segments;
   means for generating control code data indicating at least a reproduction sequence of said tracks;
   means for recording each of said time-base compressed audio signal segments and said segment start and end identification signals and said control code data in a predetermined relationship in corresponding segments of a track other than the track in which the still image is recorded, with respective ones of said segment start and end identification signals at respective leading and trailing edges of each said time-base compressed audio signal segments;

means for detecting the location of the end identification signal in each track segment for determining the length of each time-base compressed audio segment; and means for shifting the location of said end identification signal and said control code data in accordance with a determined length within a respective track segment, so that upon reproduction said segment start and end identification signals are available following reproduction for time-base expansion and annexation of the audio signal segments into a continuous audio signal.

2. Apparatus according to claim 1, in which said means for time-base compressing each of said plurality of audio signal segments includes a write/read address counter for controlling said memory; first and second clock signal generators for generating respective first and second clock signals fed to said write/read address counter, said first clock signal corresponding to said selected clock frequency and having a frequency substantially less than said second clock frequency, whereby said write/read address counter generates write addresses at a first frequency and read addresses at a second, higher frequency.

3. Apparatus according to claim 2, in which said second clock signal generator produces at second clock signal having a frequency 640 times the frequency of said first clock signal.

4. A signal recording apparatus in which fields of video signals are sequentially recorded field-by-field on a corresponding plurality of concentrically arranged tracks on a rotary record medium, and selected ones of remaining tracks on the record medium are arranged to have analog audio signals corresponding to respective video fields recorded thereon, the recording apparatus comprising:

means for recording a field of said video signals in a selected track on said rotary record medium:

means for dividing the audio signal into a plurality of audio segments;

means for time-compressing each of the plurality of audio segments;

means for generating segment start identification signals and segment end identification signals;

means for generating control code data indicating at least a reproduction sequence of said audio signals recorded in said plurality of record tracks;

means for adding a segment start identification signal at the leading edge of each said time-base compressed audio segment, adding a segment end identification signal at a trailing edge of each said time-base compressed audio segment and adding said control code data at a predetermined interval from a trailing edge of said end identification signal;

means for shifting the location of said end identification signal and said control code data within a corresponding respective segment of a track on said record medium; and means for recording the time-base compressed audio segments including the segment start identification and segment end identification and control code data in corresponding segments of a selected track on said record medium other than the track selected for the video signals.

5. Apparatus according to claim 4 in which said control code data comprises address data indicating a number of a track on said rotary record medium.

6. A signal recording apparatus according to claim 4, in which said control code data includes data indicating whether a track containing said control code data is one of a plurality of tracks constituting a continuous audio signal for subsequent continuous reproduction.

7. A signal recording apparatus according to claim 4 in which said control code data comprises data indicating a track number of a video signal corresponding to an audio signal recorded thereon containing said control code data.

8. A signal recording apparatus according to claim 4, in which said control code data includes data indicating the year, month and day.

9. A recording apparatus according to claim 4, in which said control code data includes data indicating a time-compression ratio of said time-compressed audio signals.

10. A signal recording and reproducing apparatus of the kind wherein a field of video signals is recorded on a selected track of a rotary record medium and a corresponding analog audio signal is recorded on another, concentric, selected track of the rotary record medium, the apparatus comprising:

means for recording a video field in the selected track;

means for dividing an audio signal corresponding to the respective recorded video field into a plurality of segments;

means for time-base compressing each of said plurality of segments;

means for generating segment start and end identification signals for each of said time-base compressed segments;

means for generating control code data indicating at least a track address for said audio signal;

means for associating said segment start and end identification signals at respective leading and trailing edges of each of said segments and said control code data following said end identification signal for producing composite segments therefrom;

means for detecting the location of the end identification signal in each track segment for determining the length of each time-base compressed audio segment;

means for shifting the location of said end identification signal and said control code data within a respective segment; and means for recording each of said composite segments on another said track of the record medium, whereby upon reproduction said segment start and end identification signals are available for time-base expansion and annexation of the plurality of audio signal segments into a continuous audio signal.

11. Apparatus according to claim 10, in which said means for time-base compressing each of said plurality of audio signal segments includes a memory; a write/-read address counter; first and second clock signal generators for generating respective first and second clock signals, said first and second clock signal generators for generating respective first and second clock signals, said first clock signal corresponding to selected clock frequency, said first and second clock signals being fed to said write/read address counter for generating write addresses at a first frequency and read addresses at a second higher frequency.

12. Apparatus according to claim 11, in which said second clock signal generator produces a second clock signal having a frequency 640 times the frequency of said first clock signal.

13. A signal recording apparatus in which fields of video signals are sequentially recorded field-by-field on a corresponding plurality of concentrically arranged tracks on a rotary record medium, and selected ones of remaining tracks on the record medium are arranged to have analog audio signals corresponding to respective video fields recorded thereon, wherein each selected one of the remaining tracks is divided into plural track segments and audio signals compressed along the time axis are recorded in selected ones of said plural track divided segments, the recording apparatus comprising:

means for recording a field of said video signals in a selected track on said rotary record medium;

means for dividing the audio signal into a plurality of audio segments;

means for time-compressing each of the plurality of audio segments to form time-base compressed audio segments;

means for generating control code data indicating at least a reproduction sequence of said audio signals recorded in said plurality of record tracks;

means for generating a segment start identification signal and a segment end identification signal having specific polarities which are a combinaton of positive and negative level flags so as to identify a scanning sequence of the track portions of said divided audio segments;

means for adding a segment start identification signal at the leading edge of each said time-base compressed audio segment, adding a segment end identification signal at a trailing edge of each said time-base compressed audio segment and adding said control code data at a predetermined interval from a trailing edge of said end identification signal; and means for recording the time-base compressed audio segments including the segment start identification and segment end identification and control code data in corresponding selected ones of said divided track segments of a selected track on said record medium other than the track selected for the video signals.

* * * * *

UNITED STATES PATENT AND TRADEMARK OFFICE
CERTIFICATE OF CORRECTION

PATENT NO. : 4,816,928

DATED : March 28, 1989

INVENTOR(S) : Takayuki Sasaki et al.

It is certified that error appears in the above-identified patent and that said Letters Patent is hereby corrected as shown below:

Title page:

In U.S. Patent Documents, patent No. 4,348,699, inventors name is --Tsuchiya-- not Tsuchoya"

Column 9, line 35, after "signal" insert --$\ell$--;
        line 38, after "signal" insert --$\ell$--.

IN CLAIMS
Column 14, line 13, after "claim 4" insert --,--.

Signed and Sealed this

Twenty-third Day of January, 1990

Attest:

JEFFREY M. SAMUELS

Attesting Officer     Acting Commissioner of Patents and Trademarks